(12) United States Patent
Chen

(10) Patent No.: US 12,438,214 B2
(45) Date of Patent: Oct. 7, 2025

(54) CHARGE-DISCHARGE DEVICE WITH ACTIVE TEMPERATURE CONTROL

(71) Applicant: Lee-Fei Chen, Taipei (TW)

(72) Inventor: Lee-Fei Chen, Taipei (TW)

( * ) Notice: Subject to any disclaimer, the term of this patent is extended or adjusted under 35 U.S.C. 154(b) by 614 days.

(21) Appl. No.: 17/884,186

(22) Filed: Aug. 9, 2022

(65) Prior Publication Data
US 2024/0055696 A1   Feb. 15, 2024

(51) Int. Cl.
*H01M 10/6563* (2014.01)
*H01M 10/48* (2006.01)
*H01M 10/63* (2014.01)

(52) U.S. Cl.
CPC ..... *H01M 10/6563* (2015.04); *H01M 10/486* (2013.01); *H01M 10/63* (2015.04)

(58) Field of Classification Search
CPC . H01M 10/6563; H01M 10/63; H01M 10/486
See application file for complete search history.

(56) References Cited

U.S. PATENT DOCUMENTS

2014/0356657 A1* 12/2014 Yamamoto ............ H01M 10/63
429/62

FOREIGN PATENT DOCUMENTS

WO    WO-2020110096 A1 *  6/2020  ............. B60L 50/64

OTHER PUBLICATIONS

WO-2020110096-A1 english translation (Year: 2020).*

* cited by examiner

*Primary Examiner* — Jimmy Vo
(74) *Attorney, Agent, or Firm* — MUNCY, GEISSLER, OLDS & LOWE, P.C.

(57) ABSTRACT

A charge-discharge device with active temperature control, connected with an external air blowing device, includes a battery compartment, a battery module, a controller and at least one temperature sensor. The battery compartment includes an accommodation space, at least one air inlet pipe and at least one air outlet pipe. The battery module is arranged in the accommodating space for charging or discharging. The controller determines whether the temperature of the accommodating space is within a working temperature range of the battery module according to the temperature sensor. When the temperature of the accommodating space exceeds the working temperature range, the controller controls the external air blowing device to supply cold or warm air. The cold or warm air flows into the accommodating space through the air inlet pipe and flows out through the air outlet pipe to achieve the effect of cooling or warming the battery module.

9 Claims, 5 Drawing Sheets

CHARGE-DISCHARGE DEVICE WITH ACTIVE TEMPERATURE CONTROL

BACKGROUND OF THE INVENTION

1. Field of the Invention

The present invention relates to a charge-discharge device, in particular to a charge-discharge device with active temperature control.

2. Description of the Prior Arts

Environmental protection and energy saving are one of the main trends of technological development in recent years. Therefore, batteries that can be repeatedly charged and discharged are widely used in charge-discharge devices in various life and industrial fields, such as charge-discharge devices for electric motorcycles and electric vehicles. This type of charge-discharge device includes a battery pack composed of at least one rechargeable battery. In order to meet the usage habits of general consumers and improve the convenience of use of products, charging efficiency and safety of rechargeable batteries are key features that must be taken into account and improved for such rechargeable products at the same time. No matter what material the rechargeable battery is made of, it has a suitable working temperature range for normal operation. When the battery temperature is higher or lower than the working temperature range, the efficiency of the charging and discharging of the rechargeable battery would be degraded.

However, the rechargeable battery generates a large amount of heat energy during charging/discharging, which increases the temperature of the battery. If the heat energy is not dissipated in time, the temperature of the rechargeable battery during charging/discharging may continue to rise beyond the working temperature range. However, overheating may make the rechargeable battery work improperly, even leading to battery damage and more serious danger such as explosion and injury. On the other hand, when the temperature of the charge-discharge device is far below its working temperature range, the electrolyte in the rechargeable battery may condense and the stored electrical energy capacity may be greatly reduced, which result in poor charging/discharging efficiency of the rechargeable battery.

In conclusion, due to the limitation of ambient temperature, in order to charge/discharge the rechargeable battery of the charging and discharging device with high efficiency and at the same time ensure its safety in use, the existing charge-discharge device including the rechargeable battery must be further improved.

SUMMARY OF THE INVENTION

In view of the drawbacks that the battery temperature of the rechargeable battery is higher or lower than its operating temperature range and that it is not efficient to the charge-discharge work and may even be dangerous, the present invention provides a charge-discharge device with active temperature control, which is connected with an external air blowing device, the charge-discharge device comprising:

a battery compartment including:
  an accommodating space having at least one air inlet and at least one air outlet;
  at least one air inlet pipe disposed outside the battery compartment and communicating with the accommodating space through the at least one air inlet, wherein the accommodating space communicates with the external air blowing device through the at least one air inlet pipe; and at least one air outlet pipe disposed outside the battery compartment and communicating with the accommodating space through the at least one air outlet;

a battery module disposed in the accommodating space for connecting to an external charging power supply to receive a charging voltage, or connected to a load to transmit a discharging voltage;

at least one temperature sensor disposed in the accommodating space for sensing the temperature of the accommodating space to generate at least one temperature sensing information; and a controller electrically connected to the external air blowing device and the at least one temperature sensor, for receiving the at least one temperature sensing information output by the at least one temperature sensor and generating a control signal according to the at least one temperature sensing information to control the external air blowing device to transport cold air or warm air.

During charging and discharging of the battery module, the controller can determine whether the battery module is within a working temperature range according to the at least one temperature sensor. When the battery module is not in the working temperature range, the controller actively controls the external air blowing device to transport cold air or warm air. Then the cold air or warm air flows into the accommodating space through the at least one air inlet pipe, and then flows out through the at least one air outlet pipe to cool the battery module, so that the battery module can be maintained to operate within the working temperature range.

DETAILED DESCRIPTION OF THE PREFERRED EMBODIMENTS

Figure 1:
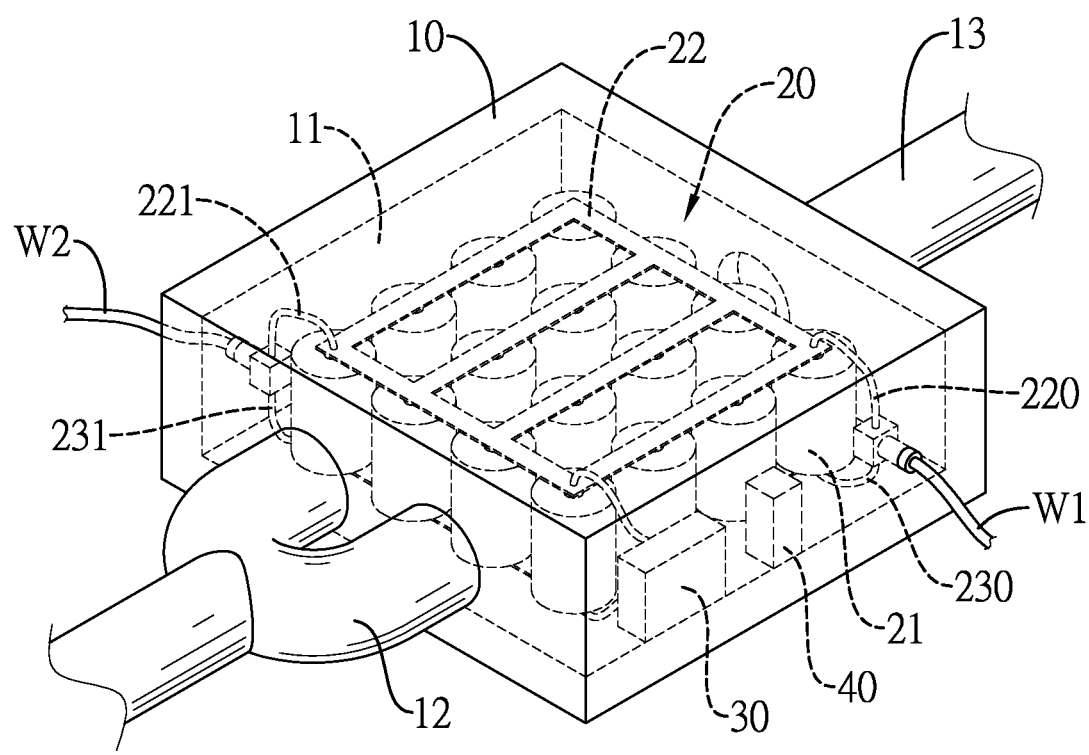
FIG. 1 is a schematic perspective view of a charge-discharge device with active temperature control of the present invention.
Figure 2:
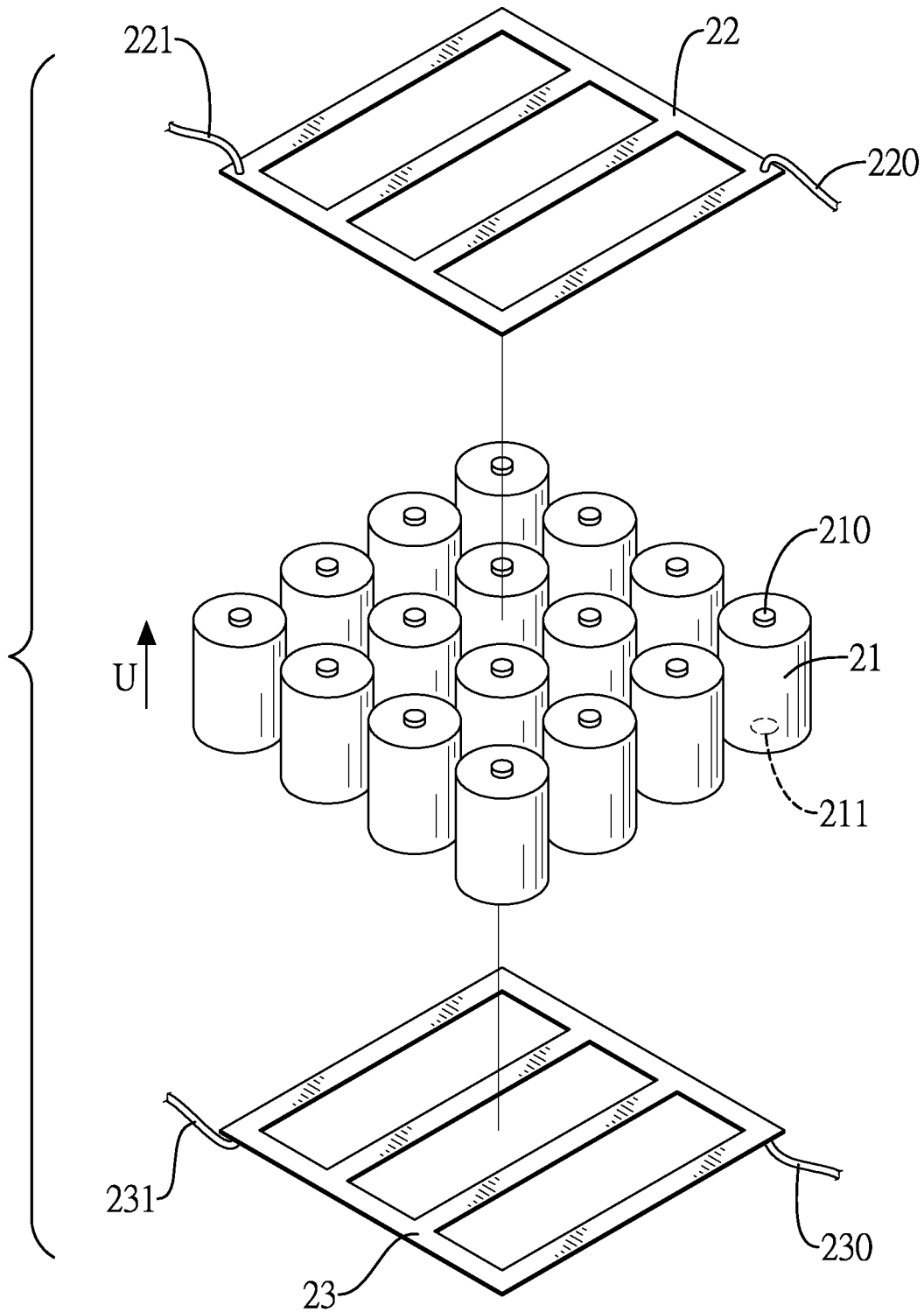
FIG. 2 is an exploded schematic perspective view of a power module according to an embodiment of the present invention.

Referring to FIG. 1 and FIG. 2, the present invention is a charge-discharge device with active temperature control, which is interconnected with an external air blowing device (not shown). The present invention includes a battery compartment 10, a battery module 20, a controller 30 and at least one temperature sensor 40.

The battery compartment 10 includes an accommodating space 11, at least one air inlet pipe 12 and at least one air outlet pipe 13. The accommodating space 11 has at least one air inlet and at least one air outlet. The at least one air inlet pipe 12 and the at least one air outlet pipe 13 are disposed outside the battery compartment 10 and communicate with the accommodating space 11 through the at least one air inlet and the at least one air outlet respectively. The at least one air inlet pipe 12 is used to discharge air into the accommodating space 11, and the at least one air outlet pipe 13 is used to discharge air from the accommodating space 11. The accommodating space 10 communicates with the external air blowing device through the at least one air inlet pipe 12. In a preferred embodiment of the present invention, the at least one air inlet pipe 12 and the at least one air outlet pipe 13 are respectively disposed on opposite sides of the battery compartment 10, so that the air flowing into the accommodating space 11 has a better convection effect.

The battery module 20 is disposed in the accommodating space 11 of the battery compartment 10, is connected to an external charging power supply (not shown) through a charging wire W1 to receive a charging voltage, or is connected to a load through a discharging wire W2 (not shown) to transmit a discharge voltage. In a preferred embodiment of the present invention, the battery module 20 includes at least one battery 21. The battery 21 has an anode 210 and a cathode 211. When the anode 210 and the cathode 211 are respectively connected to the positive and negative terminals of the external charging power supply, the battery 21 can receive the charging voltage for charging. When the anode 210 and the cathode 211 are respectively connected to the positive and negative terminals of a load, the battery 21 can discharge the load.

In a preferred embodiment of the present invention, the battery module 20 further includes a positive conductive sheet 22 and a negative conductive sheet 23. The anode 211 of the battery 21 faces a first direction U. The positive conductive sheet 22 is electrically connected to the anode 210 of each battery 21, and the negative conductive sheet 23 is electrically connected to the cathode 211 of each battery 21. The positive conductive sheet 22 and the negative conductive sheet 23 are electrically connected to the external charging power supply to charge the batteries 21, or the positive conductive sheet 22 and the negative conductive sheet 23 are electrically connected to the load to discharge the batteries 21. In this preferred embodiment, the positive conductive sheet 22 is further connected to a first charging wire 220 and a first discharging wire 221. The negative conductive sheet 23 is further connected to a second charging wire 230 and a second discharging wire 231. The first charging wire 220 and the second charging wire 230 are connected to the external charging power supply for charging, and the first discharging wire 221 and the second discharging wire 231 are connected to the load for discharging.

Both the controller 30 and the at least one temperature sensor 40 are powered by the battery module 20. The controller 30 is electrically connected to the external air blowing device and the at least one temperature sensor 40. The at least one temperature sensor 40 is disposed in the accommodating space 11 of the battery compartment 10 for sensing the temperature of the accommodating space 11 and generating at least one temperature sensing information. The controller 30 receives the at least one temperature sensing information output from the at least one temperature sensor 40, and generates a control signal based on the at least one temperature sensing information to control the external air blowing device to supply cold air or warm air.

The battery module 20 has a working temperature range. In the present invention, the controller 30 controls the temperature of the battery module 20 within the working temperature range. Specifically, the controller 30 can be preset with an upper limit and a lower limit. When the temperature of the battery module 20 is higher than the upper limit, the battery module 20 needs to be dissipated. When the temperature of the battery module 20 is lower than the lower limit, the battery module 20 should warm up. When the temperature of the battery module 20 is between the upper limit and the lower limit, the battery module 20 can normally operate.

Figure 3:
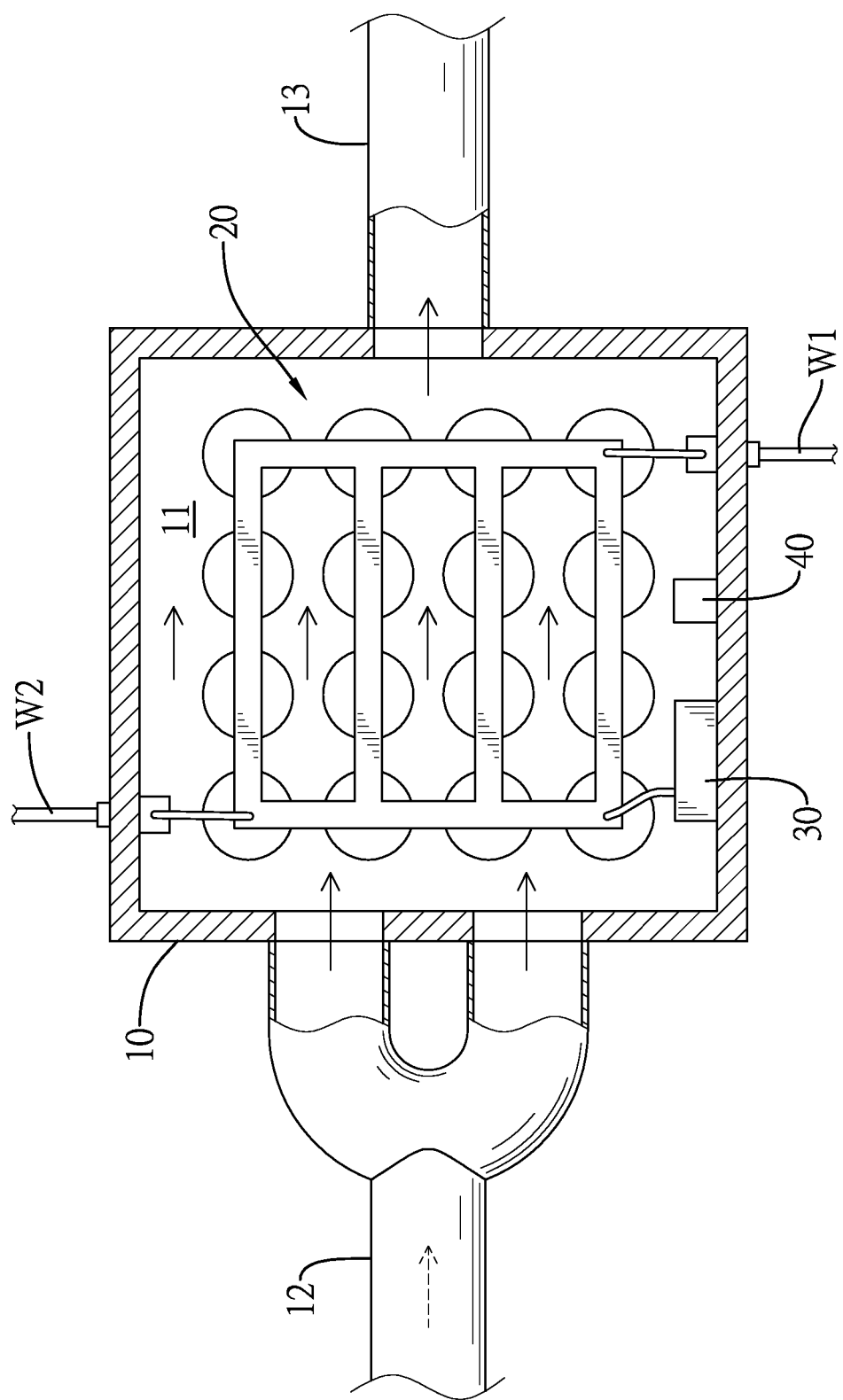
FIG. 3 is a schematic top cross-sectional view of the charge-discharge device with active temperature control of the present invention.

Referring to FIG. 3, when the battery module 20 is either charged or discharged, the temperature of the accommodating space 11 gradually increases due to the large amount of thermal energy generated by the battery 21. When the controller 30 determines that the temperature of the accommodating space 11 is higher than the upper limit, such as 45° C., according to the temperature sensing information of the at least one temperature sensor 40, the controller 30 controls the external air blowing device to supply cold air. The cold air flows into the accommodating space 11 through the air inlet pipe 12 and flows out through the air outlet pipe 13. Then the flowing cold air can take the heat energy generated by the battery 21 out of the accommodating space 11, thereby reducing the temperature of the accommodating space 11 and the battery module 20.

As an example that the present invention works in a cold area, when the controller 30 determines the temperature of the accommodating space 11 is lower than the lower limit, such as 0° C., according to the temperature sensing information of the at least one temperature sensor 40, the controller 30 controls the external air blowing device to supply warm air. The warm air flows into the accommodating space 11 through the air inlet pipe 12, and then flows out through the air outlet pipe 13. Then the flowing warm air can increase the temperature of the accommodating space 11 and the battery module 20.

Figure 4:
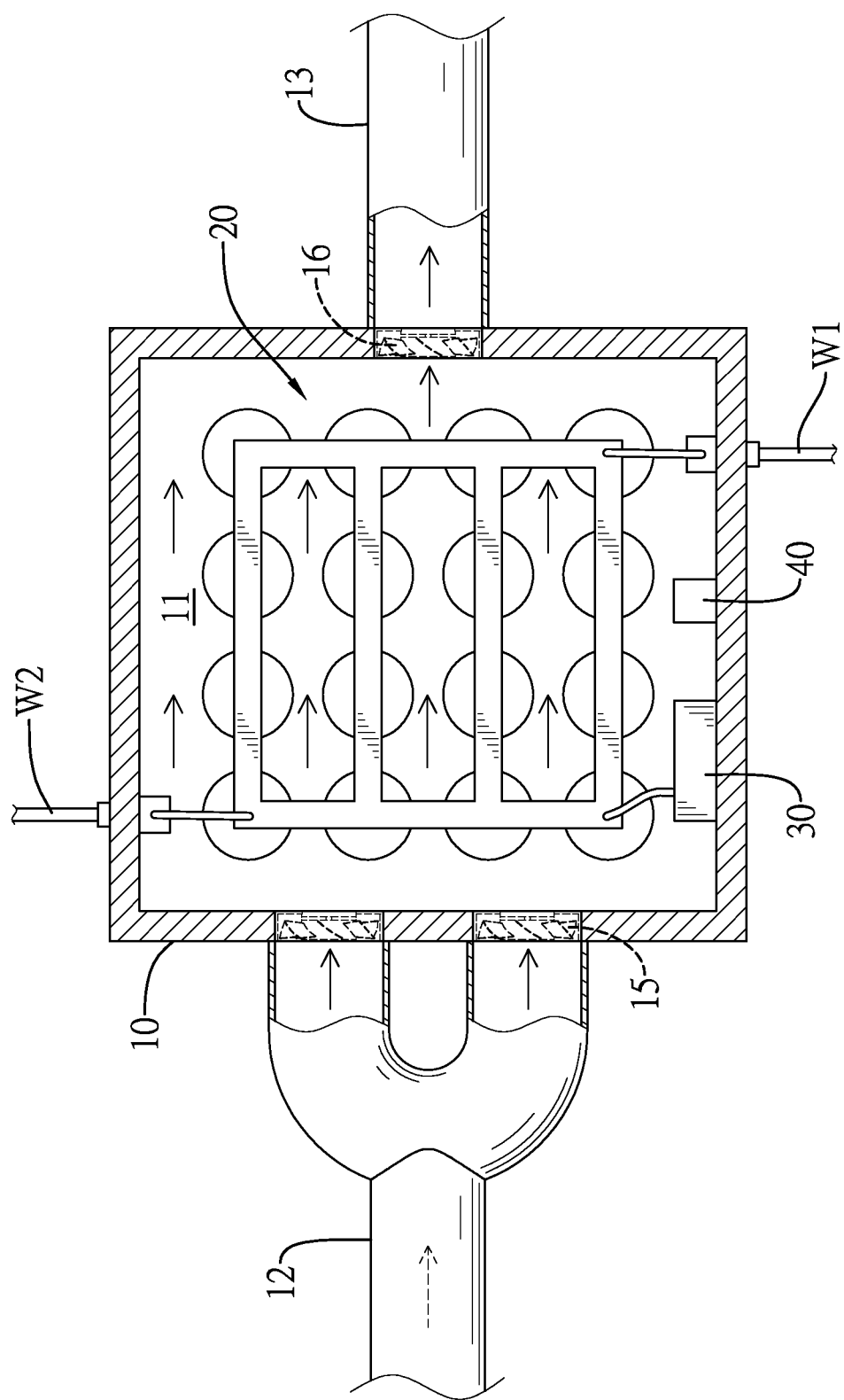
FIG. 4 is a schematic top cross-sectional view of an embodiment of the present invention.

Referring to FIG. 4, in one preferred embodiment of the present invention, the battery compartment 10 may further include at least one extractor fan 15 and at least one exhaust fan 16. The extractor fan 15 and the exhaust fan 16 are respectively disposed at the air inlet and the air outlet of the accommodating space 11 to increase the efficiency of cool air or warm air flowing in and out of the accommodating space 11, respectively. The extractor fan 15 and the exhaust fan 16 are respectively electrically connected to the controller 30 and controlled by the controller 30 to be turned on or off. When the controller 30 controls the external air blowing device to provide cold air or warm air into the accommodating space 11, the controller 30 simultaneously turns on the extractor fan 15 and the exhaust fan 16. When the controller 30 controls the external air blowing device to stop supplying cold air or warm air, the controller 30 also turns off the extractor fan 15 and the exhaust fan 16.

Figure 5:
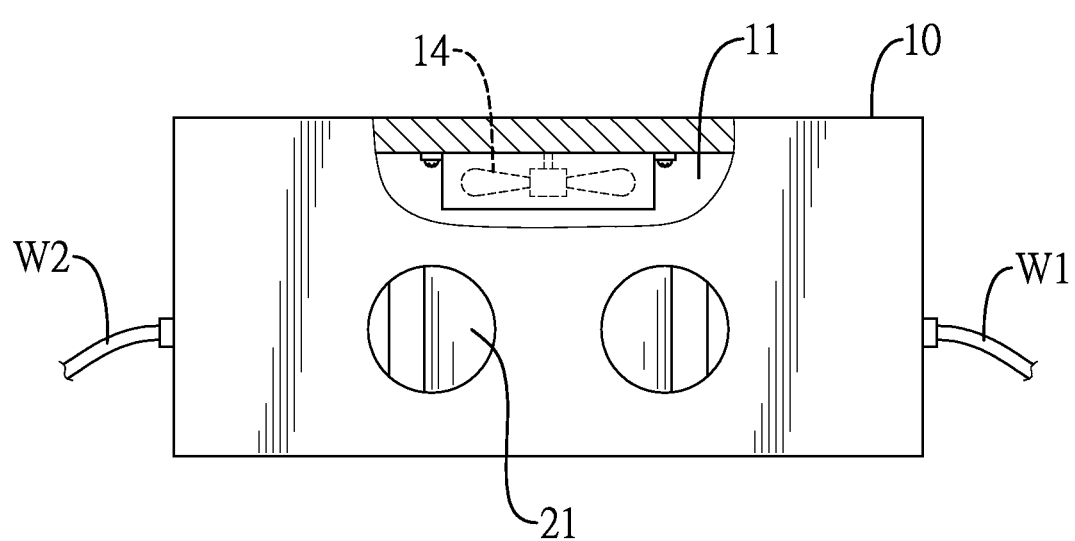
FIG. 5 is a partial schematic side view of a preferred embodiment of the present invention.

Referring to FIG. 5, in another embodiment of the present invention, the battery compartment 10 may further include at least one circulation fan 14. The circulation fan 14 is disposed in the accommodating space 11 for increasing the air flow efficiency in the accommodating space 11. The circulation fan 14 is correspondingly electrically connected to the controller 30 and controlled by the controller 30 to be turned on or off. When the controller 30 controls the external air blowing device to supply cold air or warm air into the accommodating space 11, the controller 30 controls the circulation fan 14 to turn on at the same time. When the controller 30 controls the external air blowing device to stop supplying cold air or warm air, the controller 30 also turns off the circulation fan 14.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A charge-discharge device with active temperature control, which is connected with an external air blowing device, the charge-discharge device comprising:
    a battery compartment including:
        an accommodating space having at least one air inlet and at least one air outlet;
        at least one air inlet pipe disposed outside the battery compartment and communicating with the accommodating space through the at least one air inlet, wherein the accommodating space communicates with the external air blowing device through the at least one air inlet pipe; and
        at least one air outlet pipe disposed outside the battery compartment and communicating with the accommodating space through the at least one air outlet, wherein the at least one air inlet pipe and the at least one air outlet pipe are respectively disposed on opposite sides of the battery compartment;
    a battery module disposed in the accommodating space for connecting to an external charging power supply to receive a charging voltage, or connected to a load to transmit a discharging voltage;
    at least one temperature sensor disposed in the accommodating space for sensing a temperature of the accommodating space to generate at least one temperature sensing information; and
    a controller electrically connected to the external air blowing device and the at least one temperature sensor, for receiving the at least one temperature sensing information output by the at least one temperature sensor and generating a control signal according to the at least one temperature sensing information to control the external air blowing device to supply cold air or warm air into the battery compartment.

2. The charge-discharge device with active temperature control as claimed in claim 1, wherein the battery module further includes:
    at least one battery, wherein each battery has an anode and a cathode;
    a positive conductive sheet electrically connected to the anode of each of the at least one battery;
    a negative conductive sheet electrically connected to the cathode of each of the at least one battery.

3. The charge-discharge device with active temperature control as claimed in claim 2, wherein:
    the positive conductive sheet is further connected with a first charging wire and a first discharging wire;
    the negative conductive sheet is further connected with a second charging wire and a second discharging wire;
    wherein, the first charging wire and the second charging wire are connected to the external charging power supply, and the first discharging wire and the second discharging wire are electrically connected to the load.

4. The charge-discharge device with active temperature control as claimed in claim 1, wherein the controller controls the external air blowing device to supply the cold air or the warm air to maintain the temperature of the accommodating space within a working temperature range of the battery module.

5. The charge-discharge device with active temperature control as claimed in claim 3, wherein the controller controls the external air blowing device to supply the cold air or the warm air to maintain the temperature of the accommodating space within a working temperature range of the battery module.

6. The charge-discharge device with active temperature control as claimed in claim 4, wherein the controller presets an upper limit and a lower limit, and determines the temperature of the accommodating space according to the at least one temperature sensing information of the at least one temperature sensor;
    when the temperature of the accommodating space exceeds the upper limit, the controller controls the external air blowing device to output the cold air to the accommodating space of the battery compartment;
    when the temperature of the accommodating space is lower than the lower limit, the controller controls the external air blowing device to output the warm air to the accommodating space of the battery compartment.

7. The charge-discharge device with active temperature control as claimed in claim 5, wherein the controller presets an upper limit and a lower limit, and determines the temperature of the accommodating space according to the at least one temperature sensing information of the at least one temperature sensor;
    when the temperature of the accommodating space exceeds the upper limit, the controller controls the external air blowing device to output the cold air to the accommodating space of the battery compartment;
    when the temperature of the accommodating space is lower than the lower limit, the controller controls the external air blowing device to output the warm air to the accommodating space of the battery compartment.

8. The charge-discharge device with active temperature control as claimed in claim 1, wherein the battery compartment further includes:
    at least one circulation fan disposed in the accommodating space, electrically connected with the controller, and controlled by the controller to be turned on or off.

9. The charge-discharge device with active temperature control as claimed in claim 1, wherein the battery compartment further includes:
    at least one extractor fan disposed at the at least one air inlet of the accommodating space;
    at least one exhaust fan disposed at the at least one air outlet of the accommodating space;
    wherein, the extractor fan and the exhaust fan are respectively electrically connected to the controller and controlled by the controller to be turned on or off.

* * * * *